United States Patent [19]

Ishizuka

[11] Patent Number: 5,293,184
[45] Date of Patent: Mar. 8, 1994

[54] METHOD AND APPARATUS FOR MULTI-COLOR CONTINUOUS LINE GRAPHIC RECORDING OF MULTI-CHANNEL MEASUREMENT DATA

[75] Inventor: Kiminori Ishizuka, Tokyo, Japan

[73] Assignee: Kabushiki Kaisha Toshiba, Tokyo, Japan

[21] Appl. No.: 698,093

[22] Filed: May 10, 1991

[30] Foreign Application Priority Data

May 10, 1990 [JP] Japan .................. 2-118547

[51] Int. Cl.⁵ .............................................. G01D 9/32
[52] U.S. Cl. ...................................... 346/161; 346/23; 346/34; 346/46
[58] Field of Search .................. 346/34, 35, 44, 45, 346/46, 49, 62, 140 R, 1.1, 49, 50, 23

[56] References Cited

U.S. PATENT DOCUMENTS

| | | | |
|---|---|---|---|
| 1,211,703 | 1/1917 | Hess | 346/46 |
| 1,732,718 | 10/1929 | Gluer | 346/50 |
| 2,458,418 | 1/1949 | Rast | 346/50 |
| 3,576,582 | 4/1971 | Smith | 346/34 |
| 3,596,284 | 7/1971 | Zaphiropoulos | 346/46 X |
| 3,840,878 | 10/1974 | Houston | 346/62 |
| 3,949,408 | 4/1976 | Mason | 346/62 |
| 4,040,063 | 8/1977 | Berglund | 346/23 |
| 4,249,186 | 2/1981 | Edwards | 346/35 |
| 4,433,338 | 2/1984 | Nakagawa et al. | 346/34 |
| 4,613,872 | 9/1986 | Naito | 346/34 X |

*Primary Examiner*—Joseph W. Hartary
*Attorney, Agent, or Firm*—Oblon, Spivak, McClelland, Maier & Neustadt

[57] ABSTRACT

A graphic recording method and a graphic recording apparatus capable of dealing with the multi-channel measurement data involving quick and minute changes, without causing a trouble in accurate reading of the recorded data, in a simple and compact configuration. In the apparatus, the multi-channel measurement data are recorded by plotting a monochromatic continuous line for each channel of the multi-channel measurement data on a recording paper; and a channel discrimination mark having a distinctive color is plotted, with respect to each monochromatic continuous line, at a regular interval.

18 Claims, 4 Drawing Sheets

METHOD AND APPARATUS FOR MULTI-COLOR CONTINUOUS LINE GRAPHIC RECORDING OF MULTI-CHANNEL MEASUREMENT DATA

BACKGROUND OF THE INVENTION

1. Field of the Invention

The present invention relates to a graphic recording apparatus, primarily used in an industrial laboratory, for recording measurement data graphically by plotting lines representing the measured data on a recording paper in a form of a graph.

2. Description of the Background Art

In an industrial laboratory, the data obtained by the measurement are often recorded graphically by using a graphic recording apparatus of various types such as a multiple colored pen line plotter type, an impact dot plotter type, an ink jet plotter type, and a thermographic plotter type.

In such a graphic recording apparatus, the measurement data given by outputs of measurement devices are taken in as multi-channel inputs and are plotted on a recording paper in a form of a graph in which the measurement data of each channel is represented by a line plotted on the recording paper.

However, each type of such a conventional graphic recording apparatus has been associated with the following drawbacks.

First, in a graphic recording apparatus of a multiple colored pen line plotter type, a configuration of the apparatus becomes increasingly large and complicated as a number of colored pens used in the apparatus increases, such that an apparatus using five or more colored pens has been practically too large and too complicated. Thus, in this type of a conventional graphic recording apparatus, a recording of the measurement data with five or more channels has been difficult.

On the other hand, in a graphic recording apparatus of an impact dot plotter type, the configuration of the apparatus can be simplified compared with the multiple colored pen line plotter type such that the apparatus itself can be made in a compact size, but the measurement data are represented by dotted lines such as dotted lines 101 shown in FIG. 1, so that it has been difficult to deal with the measurement data involving quick and minute changes.

As for a graphic recording apparatus of an ink jet plotter type or a thermographic plotter type, the simplification of the configuration of the apparatus can be achieved, but all the measurement data are represented by monochromatic continuous lines such as continuous lines 102 shown in FIG. 2, so that the recorded data on the recording paper become increasingly congregated to make it harder to distinguish each channel and read off each data accurately as a number of channels of the measurement data increases.

SUMMARY OF THE INVENTION

It is therefore an object of the present invention to provide graphic recording method and apparatus capable of dealing with the multi-channel measurement data involving quick and minute changes, without causing a trouble in accurate reading of the recorded data, in a simple and compact configuration.

According to one aspect of the present invention there is provided a graphic recording apparatus for graphically recording multi-channel measurement data given in a plurality of channels, comprising: monochromatic recording means for recording the multi-channel measurement data by plotting a monochromatic continuous line for each channel of the multi-channel measurement data on a recording paper; and channel discrimination mark recording means for plotting a channel discrimination mark having a distinctive color, with respect to each monochromatic continuous line plotted by the monochromatic recording means, at a regular interval.

According to another aspect of the present invention there is provided a method of graphically recording multi-channel measurement data given in a plurality of channels, comprising the steps of: recording the multi-channel measurement data by plotting a monochromatic continuous line for each channel of the multi-channel measurement data on a recording paper; and plotting a channel discrimination mark having a distinctive color, with respect to each monochromatic continuous line plotted at the recording step, at a regular interval.

Other features and advantages of the present invention will become apparent from the following description taken in conjunction with the accompanying drawings.

DETAILED DESCRIPTION OF THE PREFERRED EMBODIMENTS

Figure 1:
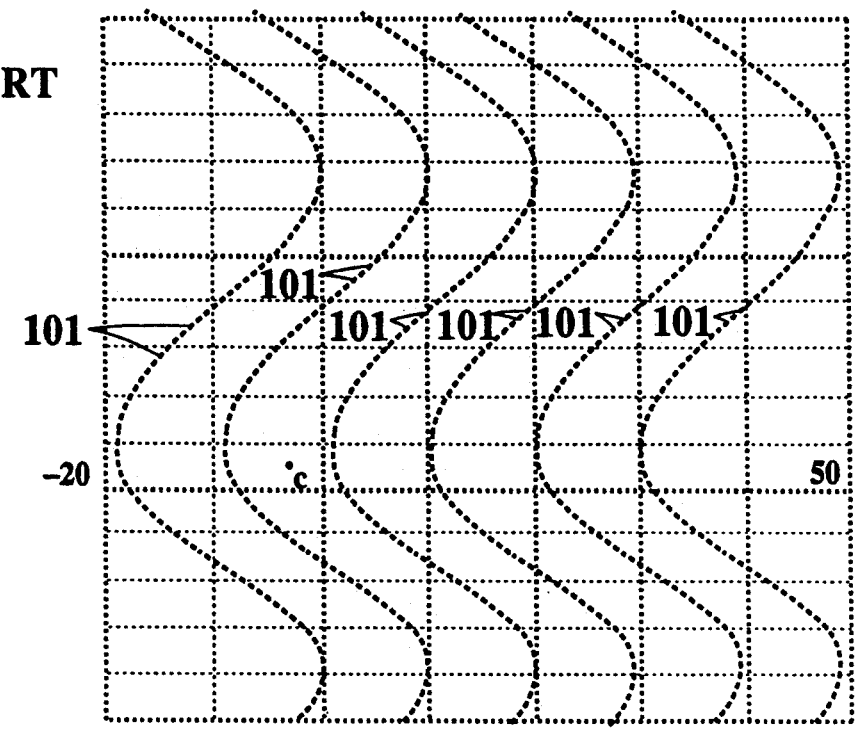
FIG. 1 is an illustration of an example of recorded data obtained by a conventional graphic recording apparatus of an impact dot plotter type.
Figure 2:
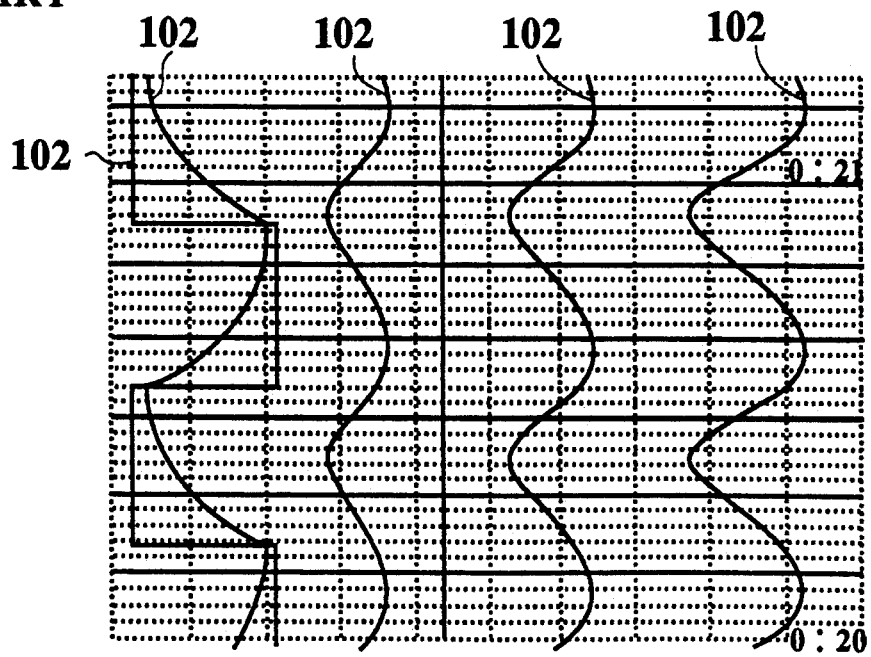
FIG. 2 is an illustration of an example of recorded data obtained by a conventional graphic recording apparatus of an ink jet plotter type or a thermographic plotter type.
Figure 3:
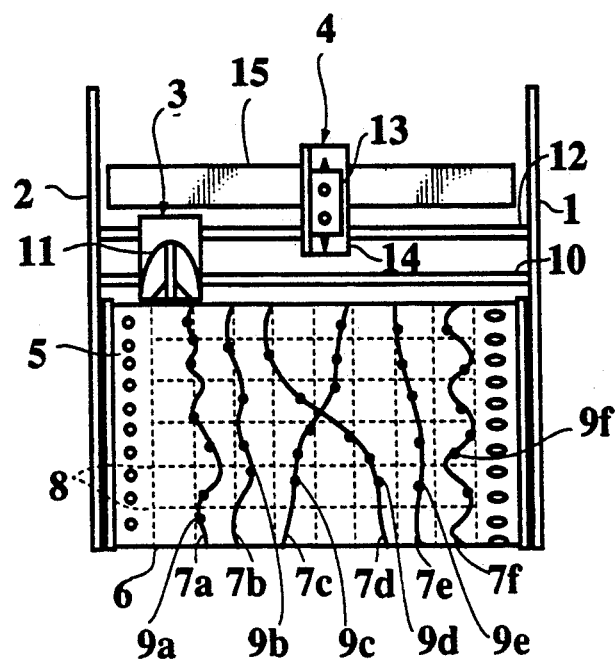
FIG. 3 is a front view of one embodiment of a graphic recording apparatus according to the present invention.
Figure 4:
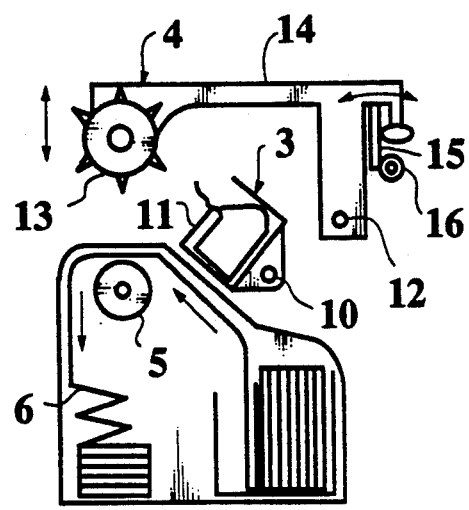
FIG. 4 is a cross sectional view of the graphic recording apparatus of FIG. 3.
Figure 5:
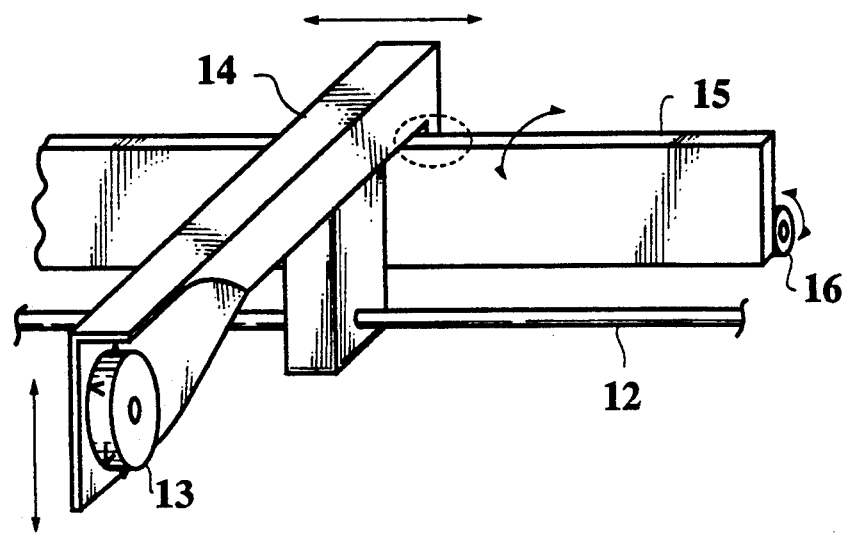
FIG. 5 is a perspective view of an impact dot plotter head unit in the graphic recording apparatus of FIG. 3.

Referring now to FIGS. 3 to 5, one embodiment of a graphic recording apparatus according to the present invention will be described in detail.

In this embodiment, the graphic recording apparatus comprises: a right frame 1 and a left frame 2 in forms of parallel plates; an ink jet head unit 3, slidably supported on a shaft 10 provided between the right frame 1 and the left frame 2, for plotting monochromatic continuous lines and scale grids on a recording paper 6; an impact dot plotter head unit 4, slidably supported on a shaft 12 provided between the right frame 1 and the left frame 2, for plotting multi-color channel discrimination marks on the monochromatic continuous lines at regular interval; and a drum 5, rotatably supported between the right frame 1 and the left frame 2 underneath the ink jet head unit 3 and the impact dot plotter head unit 4, for carrying the recording paper 6 underneath the ink jet head unit 3 and the impact dot plotter head unit 4.

Figure 6:
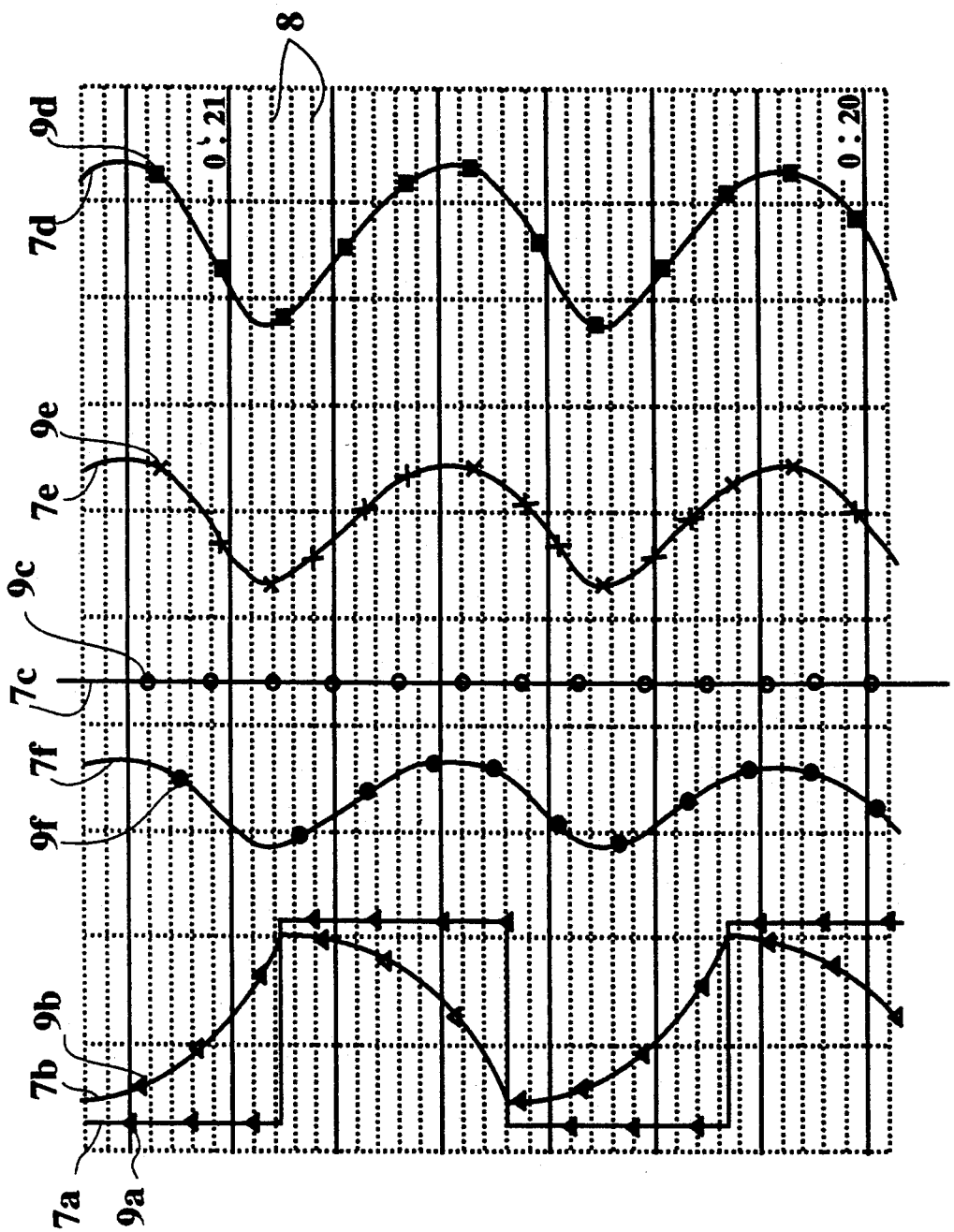
FIG. 6 is an illustration of an example of recorded data obtained by the graphic recording apparatus of FIG. 3.

In this recording apparatus, as shown in FIG. 6, the monochromatic continuous lines 7a to 7f representing multi-channel measurement data obtained by external measurement devices (not shown) as well as the scale grids 8 providing appropriate scales for each channel of the measurement data are plotted by the ink jet head unit 3, as the ink jet head unit 3 repeatedly slides back and forth on the shaft 10, while the multi-color channel discrimination marks 9a to 9f are plotted over the monochromatic continuous lines 7a to 7f by the impact dot plotter head unit 4, as the recording paper 6 is carried underneath the ink jet head unit 3 and the impact dot plotter head unit 4 by the drum 5.

The ink jet head unit 10 has an ink jet head 11 from which a monochromatic ink is sprayed onto the recording paper 6, such that the monochromatic continuous lines 7a to 7f as well as the scale grids 8 can be plotted by the ink sprayed from the ink jet head 11, as the ink jet head unit 3 repeatedly slides back and forth on the shaft 10.

The impact dot plotter head unit 4 comprises: a support member 14 slidable supported by the shaft 12; an impact dot plotter head 13 having a plurality of switchable color impact dot plotters, which is supported on a front end portion of the support member 14 straddling over the ink jet head unit 3; a plate member 15 slidably engaged with a rear end portion of the support member 14 and connected with a driving unit 16, such that the impact dot plotter head 13 can be moved up and down in a vertical direction as the support member 14 is titled backwards and forwards by the plate member 15 which is oscillated backwards and forwards by the driving unit 16, so that the the multi-color channel discrimination marks 9a to 9f can be plotted over the monochromatic continuous lines 7a to 7f, as the support member 14 repeatedly slides back and forth on the shaft 12.

The operations of the ink jet head unit 3 and the impact dot plotter head unit 4 are controlled by a programmed system controller (not shown) appropriately, as in a usual ink jet plotter type graphic recording apparatus and a usual impact dot plotter type graphic recording apparatus.

In FIG. 6, the multi-color channel discrimination marks 9a to 9f are represented by marks of different shapes, where each shape represents each color. Each of the multi-color channel discrimination marks 9a to 9f is a dot with a distinctive color, such as a purple dot 9a for the first channel continuous line 7a, a red dot 9b for the second channel continuous line 7b, a yellow dot 9c for the third channel continuous line 7c, a green dot 9d for the fourth channel continuous line 7d, a blue dot 9e for the fifth channel continuous line 7e, and a brown dot 9f for the sixth channel continuous line 7f.

Thus, in this embodiment, the monochromatic continuous lines 7a to 7f representing multi-channel measurement data are plotted by the ink jet head unit 3, so that it becomes possible to achieve a graphic recording of multi-channel measurement data involving quick and minute changes.

On the other hand, the multi-color channel discrimination marks 9a to 9f are plotted over the monochromatic continuous lines 7a to 7f by the impact dot plotter head unit 4, so that it becomes possible to achieve a graphic recording of multi-channel measurement data without causing a trouble in accurate reading of the recorded data.

Moreover, the apparatus uses the ink jet head unit 3 and the impact dot plotter head unit 4, so that it becomes possible to provide a graphic recording apparatus in a simple and compact configuration.

Figure 7:
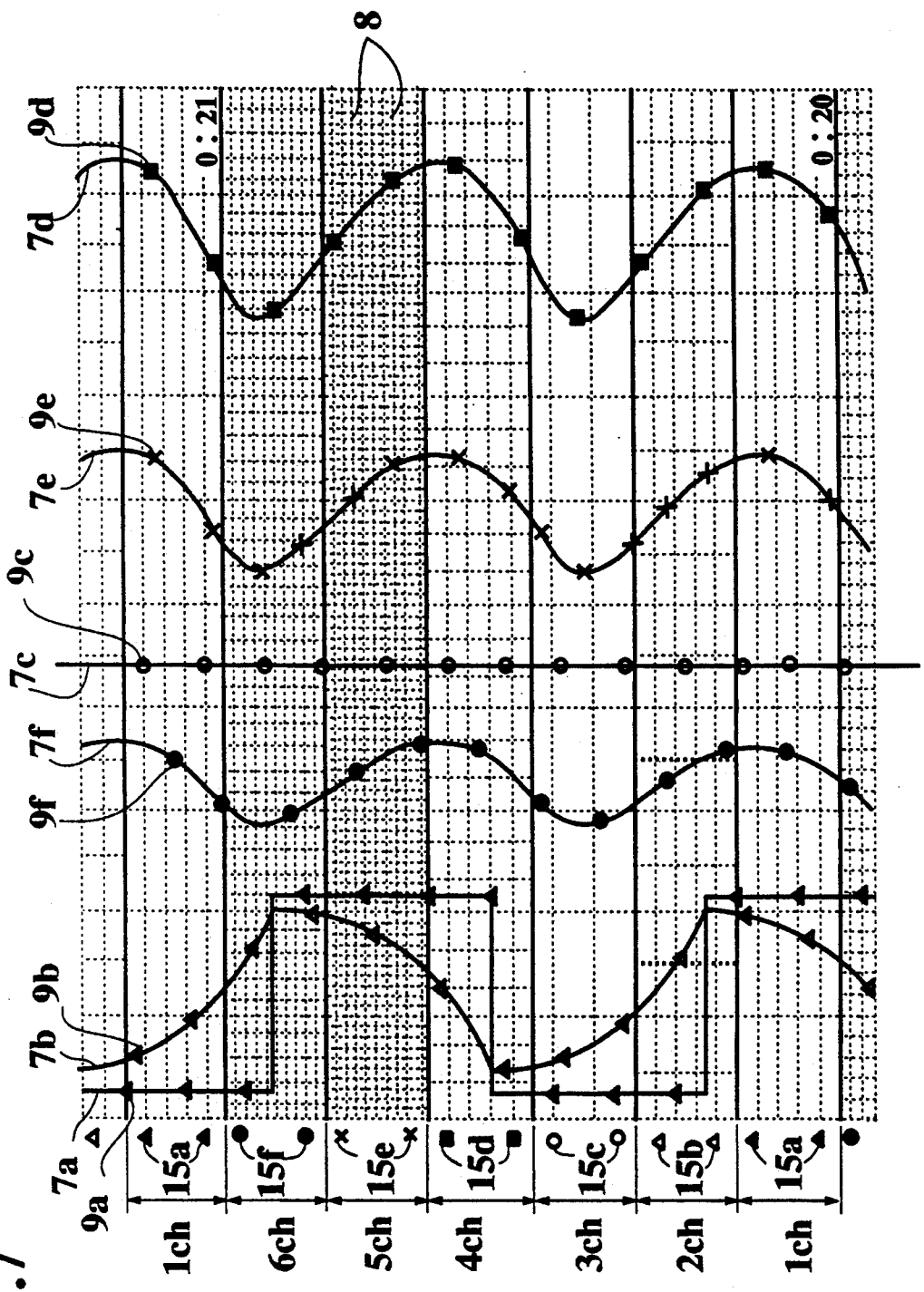
FIG. 7 is an illustration of another example of recorded data obtained by the graphic recording apparatus of FIG. 3, which incorporates additional feature of varying scale grids.

Now, in the above embodiment, the scale grids 8 plotted by the ink jet head unit 3 can be varied at different strip sections on the recording paper 6 as shown in FIG. 7.

Namely, in FIG. 7, the scale grids 8 are varied at successive strip sections to be the scale appropriate for the first, sixth, fifth, fourth, third, second, and first channel continuous lines, successively from top to bottom, such that the scale appropriate for each of the multi-channel measurement data can be provided on a single recording paper 6. In this case, the impact dot plotter head unit 4 can be controlled in such a manner that, as shown in FIG. 7, colored marks 15a to 15f corresponding to the channel discrimination mark for the channel with respect to which the scale of each strip section is set to be appropriate are plotted on an edge region of the recording paper 6, in order to facilitate an easy recognition of the channel with respect to which the scale grids 8 of each strip section is set to be appropriate.

Thus, in FIG. 7, the strip section with the scale grids 8 appropriate for the first channel continuous line 7a has purple colored marks 15a on the edge region, the strip section with the scale grids 8 appropriate for the second channel continuous line 7b has red colored marks 15b on the edge region, the strip section with the scale grids 8 appropriate for the third channel continuous line 7c has yellow colored marks 15c on the edge region, the strip section with the scale grids 8 appropriate for the fourth channel continuous line 7d has green colored marks 15d on the edge region, the strip section with the scale grids 8 appropriate for the fifth channel continuous line 7e has blue colored marks 15e on the edge region, and the strip section with the scale grids 8 appropriate for the sixth channel continuous line 7f has brown colored marks 15f on the edge region.

It is to be noted that, instead of plotting the channel discrimination marks 9a to 9f over the monochromatic continuous lines 7a to 7f as in the above embodiment, the channel discrimination marks 9a to 9f may be plotted in vicinities of the monochromatic continuous lines 7a to 7f.

Also, the channel discrimination marks 9a to 9f to be plotted over the monochromatic continuous lines 7a to 7f in the above embodiment may be plotted with lightly concentrated inks such that the monochromatic continuous lines 7a to 7f can remain visible though the channel discrimination marks 9a to 9f.

Moreover, for the sake of an improved comprehension of the different channels, the channel discrimination marks 9a to 9f may be plotted with fluorescent inks.

Besides these, many modifications and variations of the above embodiments may be made without departing from the novel and advantages features of the present invention. Accordingly, all such modifications and variations are intended to be included within the scope of the appended claims.

What is claimed is:

1. A method of graphically recording multi-channel measurement data given in a plurality of channels, comprising the steps of:

recording the multi-channel measurement data by plotting a monochromatic line for each channel of the multi-channel measurement data on a recording paper; and plotting at regular intervals in overlapping relation to each monochromatic line a channel discrimination mark having a respective color.

2. The graphic recording method of claim 1, wherein the monochromatic lines are plotted substantially continuously by an ink jet type recording head.

3. The graphic recording method of claim 2, wherein the channel discrimination mark is plotted with a lightly concentrated ink such that the monochromatic continuous line remains visible though the channel discrimination mark.

4. The graphic recording method of claim 1, where the channel discrimination mark is plotted by an impact dot plotter type recording head.

5. The graphic recording method of claim 1, wherein the channel discrimination mark is plotted with a fluorescent ink.

6. The graphic recording method of claim 1, wherein at the recording step, scale grids are also plotted on the recording paper along with the monochromatic line.

7. The graphic recording method of claim 6, wherein the scale grids are plotted to be varying at different strip sections on the recording paper.

8. The graphic recording method of claim 7, wherein at the plotting step, a colored mark corresponding to the channel discrimination mark for a channel with respect to which the scale grids of each strip section is set to be appropriate, is also plotted on an edge region of the recording paper.

9. A graphic recording apparatus for graphically recording multi-channel measurement data given in a plurality of channels, comprising:
monochromatic recording means for recording the multi-channel measurement data by plotting a monochromatic line for each channel of the multi-channel measurement data on a recording paper; and
channel discrimination mark recording means for plotting at regular intervals in overlapping relation for each monochromatic line recorded by said monochromatic recording means a respective channel discrimination mark having a respective color.

10. The graphic recording apparatus of claim 9, wherein the monochromatic recording means is an ink jet type recording head which records substantially continuous lines for each recorded channel.

11. The graphic recording apparatus of claim 10, wherein the channel discrimination mark is plotted with a lightly concentrated ink such that the monochromatic continuous line remains visible though the channel discrimination mark.

12. The graphic recording apparatus of claim 10, wherein said channel discrimination mark recording means is an impact dot plotter type recording head which is longitudinally displaced, with respect to a feeding direction of said recording paper, relative to said ink jet type recording head.

13. The graphic recording apparatus of claim 9, wherein the channel discrimination mark recording means is an impact dot plotter type recording head.

14. The graphic recording apparatus of claim 9, wherein the channel discrimination mark is plotted with a fluorescent ink.

15. The graphic recording apparatus of claim 9, wherein the monochromatic recording means also plots scale grids on the recording paper along with the monochromatic line.

16. The graphic recording apparatus of claim 15, wherein the monochromatic recording means plots the scale grids which varies at different strip sections on the recording paper.

17. The graphic recording apparatus of claim 16, wherein the channel discrimination mark recording means also plots a colored mark corresponding to the channel discrimination mark for a channel with respect to which the scale grids of each strip section is set to be appropriate, on an edge region of the recording paper.

18. A graphic recording apparatus of claim 9, wherein said monochromatic recording means and said channel discrimination mark recording means each comprise respective recording heads which are displaced longitudinally with respect to each other in relation to a direction of feeding of said recording paper.

* * * * *